United States Patent [19]

Yashiki et al.

[11] Patent Number: 4,766,788
[45] Date of Patent: Aug. 30, 1988

[54] SUPERPRECISION LATHE

[75] Inventors: Hiroshi Yashiki, Odawara; Kenji Morita, Hachioji, both of Japan

[73] Assignee: Hitachi, Ltd., Tokyo, Japan

[21] Appl. No.: 13,113

[22] Filed: Feb. 10, 1987

[30] Foreign Application Priority Data

Feb. 20, 1986 [JP] Japan ................... 61-33722

[51] Int. Cl.[4] .............................. B23B 19/02
[52] U.S. Cl. ...................... 82/30; 82/28 R; 279/3; 384/113; 384/120
[58] Field of Search ............. 82/28 R, 30, 40 R; 279/3; 384/113, 120

[56] References Cited

U.S. PATENT DOCUMENTS

| 3,533,316 | 10/1970 | Porath ............................ 82/30 |
| 3,690,780 | 9/1972 | Bjelland et al. .................. 279/3 |
| 3,735,652 | 5/1973 | Scharten ......................... 82/28 |
| 3,761,146 | 9/1973 | Unno et al. .................... 384/120 |
| 4,596,169 | 6/1986 | Inove et al. ..................... 82/30 |

FOREIGN PATENT DOCUMENTS 569584  5/1945  United Kingdom ............ 279/3

Primary Examiner—Frederick R. Schmidt
Assistant Examiner—Robert Showalter
Attorney, Agent, or Firm—Fay, Sharpe, Beall, Fagan, Minnich & McKee

[57] ABSTRACT

In a superprecision lathe of the present invention, a main spindle having mounted at one end thereof a vacuum chuck rotatably supported in an air bearing fixed on a headstock. There is formed within the main spindle a first vacuum passage connected to the vacuum chuck and opened at the outer surface of the main spindle, and a second vacuum passage formed in the headstock and of which an open end to be connected to a vacuum pump and is opened at the inner surface of the air bearing. The first vacuum passage is connected to the second vacuum passage through an interconnection region defined by two annular grooves formed at the opposite positions of the outer surface of the main spindle and the inner surface of the air bearing; therefore, it is not necessary to use a specific sealing member, any external vibration is not transmitted to the main spindle, and the object can be worked effectively with a high speed rotation of the main spindle.

4 Claims, 3 Drawing Sheets

SUPERPRECISION LATHE

BACKGROUND OF THE INVENTION a. Field of the Invention

The present invention relates to a superprecision lathe, and more particularly to a superprecision lathe suitable for working, the surface of a thin plate-like object to be worked such as a magnetic disk.

b. Description of the Prior Art

In the case where the surface of a thin plate-like object to be worked, namely, a work such as a magnetic disk by using a superprecision lathe, a vacuum chuck for holding a such work by utilizing a vacuum suction power has been widely used. In the superprecision lathe of the vacuum chuck type, it is necessary to air-tightly connect the vacuum passage formed in the main spindle as a rotating member with the vacuum passage formed in a stationary member.

For example, the Japanese Unexamined Patent Publication No. 59-53137 discloses a superprecision lathe as shown in FIG. 1, in which a floppy disk used for storage medium in a computer is cut with a bite by rotating the floppy disk at a high speed. In the superprecision lathe, a vacuum chuck 13 for holding a work is mounted on one end of a rotating spindle 5 contactlessly supported in the air bearings 8 and 9 mounted on a frame. The spindle 5 has axially provided therein a through-hole 7 connected at one end thereof to the vacuum chuck 13. The other end of the spindle 5 is connected to a cylindrical joint 6 having a through-hole to be connected to the through-hole 7 of the spindle 5. The left half (as viewed on the illustration) of the cylindrical joint 6 is housed within a coupling casing 28 fixed on the frame by means of a supporting arm 29. The coupling casing 28 has provided in the left side wall thereof a hole 30 to be connected to a suction hose 31 of the vacuum pump and which is disposed oppositely to the end of the through-hole in the cylindrical joint 6. The coupling casing 28 has provided therein a permanent magnet 32 surrounding the cylindrical joint 6 and annular pole pieces 33 and 34 surrounding the cylindrical joint 6 with a small gap between the pole pieces and the joint. There is provided a magnetic fluid 35 between the end faces of the pole pieces 33, 34 and the cylindrical joint 6 to provide a sealing between the cylindrical joint 6 as rotating member and the coupling casing 28 as stationary member.

In the conventional apparatus so constructed that the evacuation passage of the spindle 5 is connected, as sealed by the magnetic fluid 35, to the evacuation passage of the stationary member, so it is necessary to recharge the magnetic fluid 25 from time to time when it runs short as scattered as the operation of the lathe goes on. The magnetic fluid is very expensive, and so the maintenance of such lathe is not economical. Furthermore, such scattering of the magnetic fluid 35 is likely to cause an undesirable influence on the surrounding members. Therefore, much care should be exercised during the maintenance and management of such lathe. Furthermore, in the horizontal type lathe, the supporting arm 29 is undesirably a vibration source depending upon the mechanical condition of the lathe.

SUMMARY OF THE INVENTION

An object of the present invention is to present a superprecision lathe without any above-mentioned drawbacks of the conventional precision lathe and which does not incur any very fine vibration of main spindle and is suitably operable at high speed.

Other object of the present invention is to present a superprecision lathe having a vacuum connection system not requiring any sealing material such as magnetic fluid in the evacuation passage for connecting a vacuum pump to a vacuum chuck in order to securely hold a work at the end of the main spindle under the action of vacuum.

The further object and advantages of the present invention will be apparent from the following detail descriptions and accompanying drawings.

DETAILED DESCRIPTION OF THE PREFERRED EMBODIMENT

An embodiment of the superprecision lathe according to the present invention will be explained with reference to the drawings.

Figure 1:
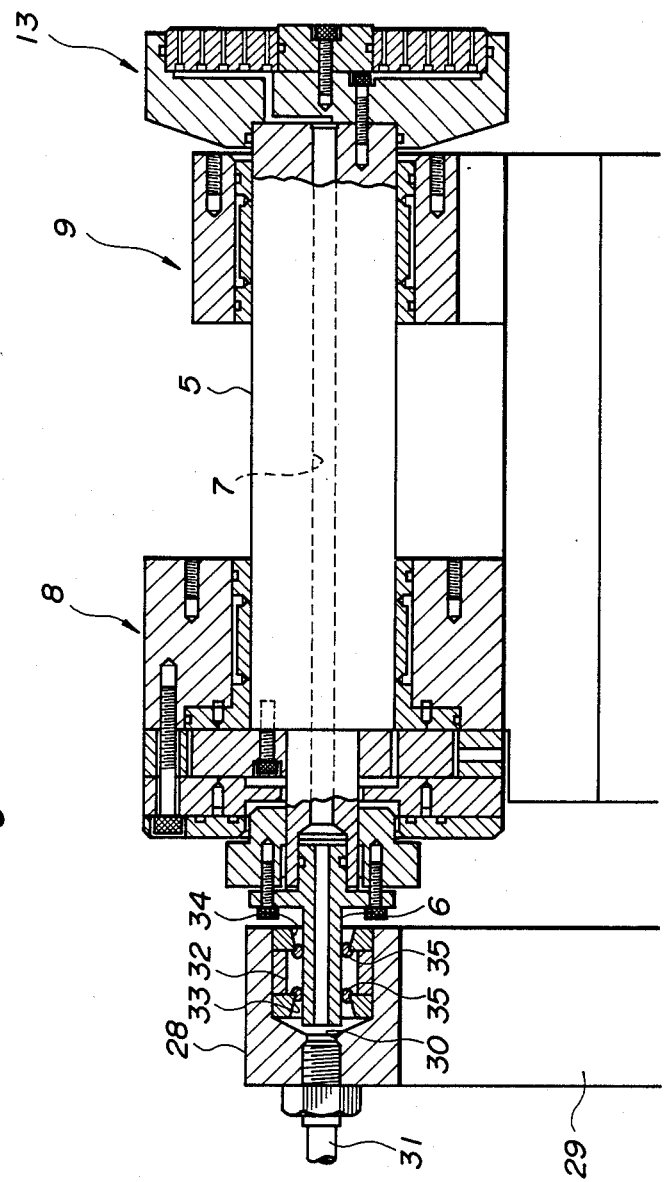
FIG. 1 is a longitudinal section showing a main spindle support of a conventional precision lathe of the type that the main spindle is supported in an air bearing.
Figure 2:
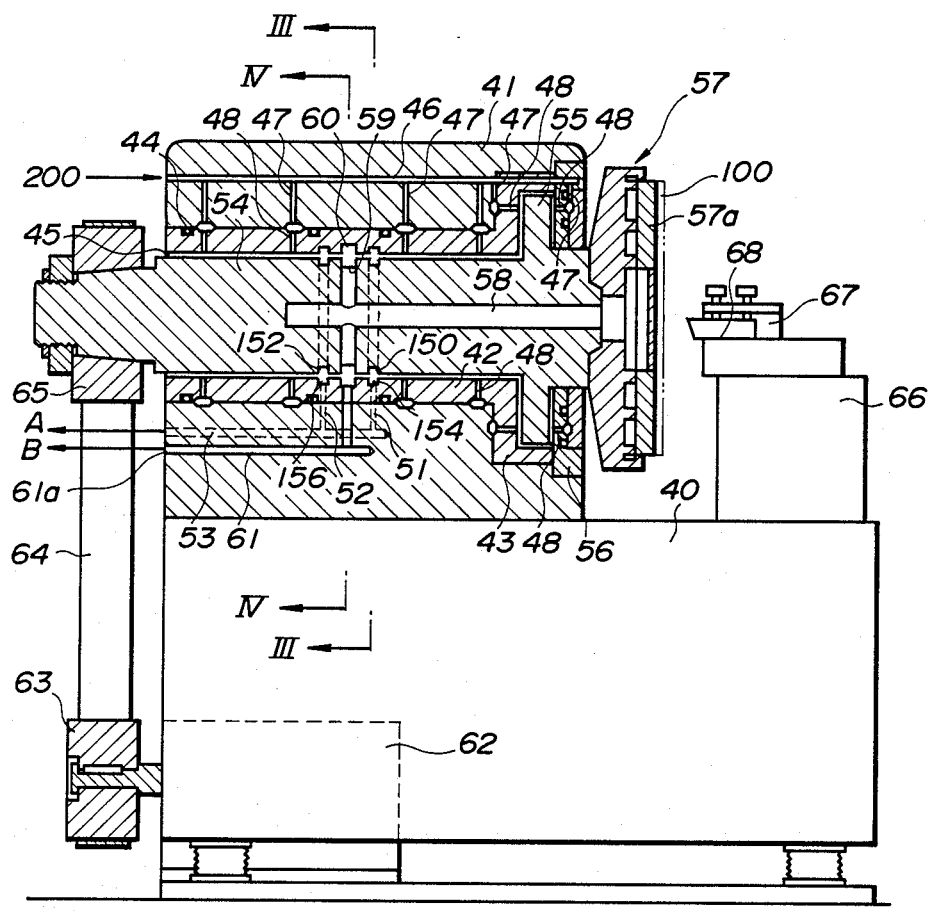
FIG. 2 is a partially longitudinal section showing the superprecision lathe of the present invention.

In FIG. 2, a bed 40 is shown which has fixed thereon a headstock 41 in which an air bearing 42 is mounted. A main spindle 54 is rotatably supported in the air bearing 42. There is mounted at one end of the main spindle 54 a vacuum chuck 57 having a holder 57a on which a work 100 is to be held under the action of a vacuum. A driven pulley 65 is mounted on the other end of the main spindle 54 and a driving pulley 63 is fixed on the shaft of an electric motor 62 mounted on the bed 40. Therefore, the main spindle 54 is so arranged as to be rotated by a belt 64 connecting the drive and driven pulleys 63 and 65. The bed 40 has a carriage 66 with a tool rest 67 on which a cutting tool 68 such as diamond bite is mounted, whereby an object is worked as the main spindle 54 is rotated with the cutting tool 68 positioned as fed by the carriage 66 and the tool rest 67.

There is formed at one end of the air bearing 42, for rotatably supporting the main spindle 54, a flange 43 by which the air bearing is fixed on the headstock 41. Sealing members 44 are provided as axially spaced from each other between the air bearing 42 and the headstock 41. There is formed a very fine gap 45 of about 20 $\mu$m between the inner surface of the air bearing 42 and the outer surface of the main spindle 54.

Figure 3:
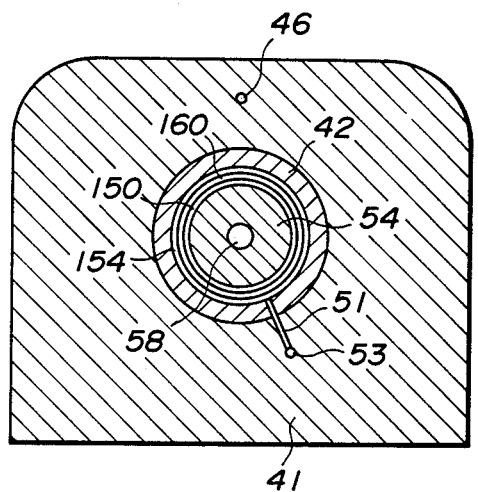
FIG. 3 is a section taken along the line III—III in FIG. 2.

Numeral 46 indicates a compressed air passage formed in the headstock 41 and one end of the air passage is connected to an air compressor (not shown). There are provided a plurality of branch paths 47 axially extending from the air passage 46, which are opened at the inner surface of the air bearing 42, each of these openings forming a blow-off orifice 48. A compressed air 200 of, for example, about 6 kg/cm$^2$ in pressure, supplied from the air compressor flows from the blow-off orifice 48 into the fine gap 45 to float the main spindle 54 with no contact within the fine gap 45. The compressed air 200 blown off from the blow-off orifice 48 escapes partially from the open end to the atmosphere and the greater part thereof is discharged through an exhaust passage to the atmosphere as will be described later. As shown in FIGS. 2 and 3, the main spindle 54 has provided on the outer surface thereof annular grooves 150 and 152 axially apart from each other, and there are provided other annular grooves 154 and 156 on the inner surface of the air bearing 42 opposite to the grooves 150 and 152, respectively. Each of the annular passages 154 and 156 has provided at a portion thereof a commucation orifice for exhaust passages 51 and 52 extending from the air bearing 42 to the inner side of the headstock 41, and the exhaust passages 51 and 52 are connected to an exhaust passage 53 extended to the end wall of the headstock 41. The compressed air flowing into the fine gap 45 is reduced in pressure at the annular pocket regions 160, as shown in FIG. 3, defined by the annular grooves 150, 154 and the annular grooves 152, 156, substantially down to the atmospheric pressure and is finally exhausted from the exhaust passage 53 as shown by the arrow A.

The main spindle 54 has provided thereon a flange portion 55 located between the air bearing 42 and an end plate 56. Both sides of the flange portion 55 are not in contact with the air bearing 42 owing to the compressed air supplied from the blow-off orifice 48 connected to the branch path 47 as shown in FIG. 2. Therefore, the main spindle 54 can be rotatably supported in the air bearing 42 without any contact with the latter.

As shown in FIG. 2, the main spindle 54 has provided on one end thereof a vacuum chuck 57 which is to hold a work 100. A first vacuum passage 58 connected to the vacuum chuck 57 is formed in the main spindle 54. The vacuum passage 58 is composed of a path extending from the end portion at which the vacuum chuck 57 is attached in the axial direction, and another path extending from the first path and opened at the outer surface of the main spindle 54. The main spindle 54 has formed on the outer surface thereof at which the vacuum passage 58 is opened a first annular groove 59 located at the intermediate position between the exhaust grooves 150 and 152.

Figure 4:
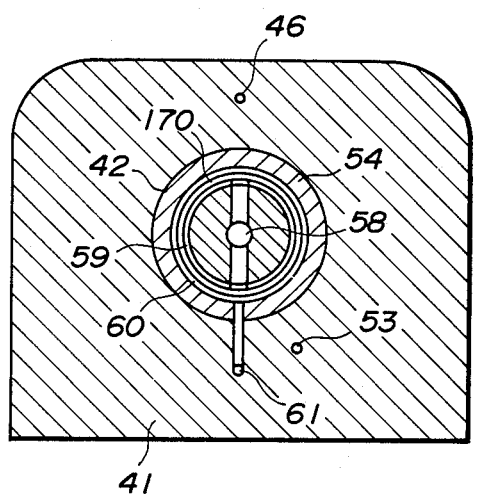
FIG. 4 is a section taken along the line IV—IV in FIG. 2.

The air bearing 42 has provided at the inner surface thereof a second annular groove 60 opposite to the first annular groove 59 and of which a portion is connected to a second vacuum passage 61 extending through the headstock 41 from the inner surface of the air bearing 42 to the exhaust port 61a provided at one end of the headstock 41. The exhaust port 61a of the second vacuum passage 61 is designed for connection to a vacuum pump (not shown). The arrow B denotes a hose providing a connection between the exhaust port 61a and the vacuum pump. The space defined by the first annular groove 59 in the outer surface of the main spindle 54 and the second annular groove 60 in the inner surface of the air bearing 42, the groove 59 being opposite to the groove 60, form together an interconnection region 170 for communicating the first vacuum passage 58 with the second vacuum passage 61 through the fine gap 45 as shown in FIG. 4. Thus as the vacuum pump operates, the air in the first vacuum passage 58, the interconnection region 170 and the second vacuum passage 61 is discharged so that the work 100 is securely held by a holder 57a of the vacuum chuck 57.

Actually, a very little portion of the compressed air flowing into the fine gap 45 flows into the interconnection region 170 without being discharged from the pocket region 160 through the exhaust passage 53, so the vacuum reduction is negligible in comparison with the output of the vacuum pump. Therefore, the problem of a reduction of vacuum power can be avoided substantially.

As mentioned above, according to the present invention, the compressed air is supplied from the air compressor into the fine gap 45 between the outer surface of the main spindle 54 and the inner surface of the air bearing 42, thereby floating the main spindle 54. Also there are provided at a portion of the fine gap 45 two annular pocket regions 160 connected to the exhaust passages 51 and 52, respectively, which communicate with the atmosphere from the air bearing 42 to the headstock 41. Furthermore, there is provided between the two annular pocket regions 160, an interconnection region 170 for communicating the first vacuum passage 58 with the second vacuum passage 61 connected to the vacuum chuck 57 mounted on the end of the main spindle 54; therefore, it is not necessary to use any sealing member because the first vacuum passage 58 led to the vacuum chuck 57 communicates with the second vacuum passage 61 to be connected to the vacuum pump through the interconnection region 170, even when the main spindle is rotated at high speed.

The precision lathe of the present invention operates as mentioned below:

As the compressed air 200 is supplied from the air compressor to the compressed air path 46 formed in the headstock 41, the compressed air 200 flows into the fine gap 45 formed between the air bearing 42 and the main spindle 54 through the branch path 47 and the blow-off orifice 48. Then, the air pressure within the gap 45 is increased, whereby the main spindle 54 is rotatably supported contactlessly in the air bearing 42.

A part of the compressed air flowing into the gap 45 is leaked from the open end of the fine gap 45 to the atmosphere or from the two pocket regions 160 connected to the exhaust passages 51 and 52, respectively, to the interconnection region 170 defined by the first and second annular grooves 59 and 60; however, the greater part of the compressed air is discharged from the two pocket regions 160 to the exhaust passages 51, 52 and 53.

On the other hand, as the vacuum pump connected to the second vacuum passage 61 operates, the air in the first and second vacuum passages 58 and 61 is discharged through the interconnection region 170. Therefore the work 100 such as a thin aluminum substrate used for a magnetic disk is held, as securely attached, on the holder 57a of the vacuum chuck 57.

Then, the motor 62 is driven to rotate the main spindle 54 at a speed of e.g. about 2000 rpm by means of the driving pulley 63, the belt 64 and the driven pulley 65, whereby the cutting tool 68 is positioned as fed by the carriage 66 and the tool rest 67 and thus the work is cut.

Since any vibration from the supporting arm as vibration source is avoided and any vibration of the stationary member is not transmitted to the main spindle 54 owing to the supporting of the main spindle 54 by the air bearing 42, even the work 100 like an aluminum substrate being rotated at high speed can be finished to a surface roughness $R_{max}=0.03$ μm (result value).

Furthermore, the first vacuum passage 58 in the main spindle 54 at the rotating member communicates with the second vacuum passage 61 formed as extending from the air bearing 42 to the headstock 41 as the vacuum passage at the stationary member through the interconnection region 170 defined by the first annular groove 59 formed on the outer surface of the main spindle 54 and the second annular groove 60 formed on the inner surface of the air bearing 42. Therefore an air tightness to obtain a predetermined vacuum pressure can be maintained even when the main spindle 54 is rotated at any high speed.

Furthermore, according to the present invention, since no magnetic fluid for sealing the vacuum passages is required, it is unnecessary to take any measures for replenishing the magnetic fluid each time when it is consumed and also for preventing the magnetic fluid from adhering, as splashed, to any surrounding members. So, the superprecision lathe according to the present invention can be simply installed, maintained and managed.

While the present invention has been particularly described with reference to the specific embodiment thereof, it is to be understood that the words which have been used are descriptive rather than limitative and that changes may be made within the purview of the appended claims without departing from the true scope and spirit of the present invention in its broader aspects.

What is claimed is:

1. A superprecision lathe, comprising a main spindle rotatably supported contactlessly in an air bearing mounted on a headstock, vacuum chuck means fixed on one end of said main spindle for holding an object to be worked, driving means for rotating the other end of said main spindle, a first vacuum passage formed in said main spindle and opened at an orifice on the outer surface of said main spindle and being connected to said vacuum chuck means, a first annular groove including said orifice and formed on the outer surface of said main spindle, a second annular groove formed on the inner surface of said air bearing, said second annular groove being opposite to said first annular groove, and a second vacuum passage extending from said second annular groove through said air bearing and said headstock so as to be connected to a vacuum pump disposed outside of said headstock, wherein the space defined by said first and second annular grooves is an interconnection region for said first and second vacuum passages, two annular pocket regions at a gap formed by the outer surface of said main spindle and the inner surface of said air bearing, means for supplying compressed air from an air compressor to said gap, said two annular pocket regions being located respectively at both side of said interconnection region and spaced axially apart from each other, and each of said annular pocket regions being connected to an exhaust passage opened at the inner surface of said air bearing and one end of said headstock.

2. A superprecision lathe according to claim 1, wherein said first vacuum passage is composed of a horizontal passage axially extending through said main spindle and connected to said vacuum chuck means at one end, and further composed of two passages radially extending from the other end of said horizontal passage to the outer surface of said main spindle and opened at said orifice on the outer surface of said main spindle.

3. A superprecision lathe according to claim 1, wherein said two annular pocket regions are positioned with axial equidistant spacing from said interconnection region.

4. A superprecision lathe according to claim 3, wherein said two annular pocket regions are defined by two other annular grooves in the outer surface of said main spindle disposed axially apart from each other and at both sides of said first annular groove and with axial equidistant spacing from said interconnection region, and two further other annular grooves in the inner surface of said air bearing disposed at both sides of said second annular groove, said two other annular grooves being opposite to said two further other annular grooves, respectively.

* * * * *